May 8, 1923.
W. A. SCOTT
AUTOMOBILE LICENSE PLATE CASING
Filed May 5, 1922
1,454,792
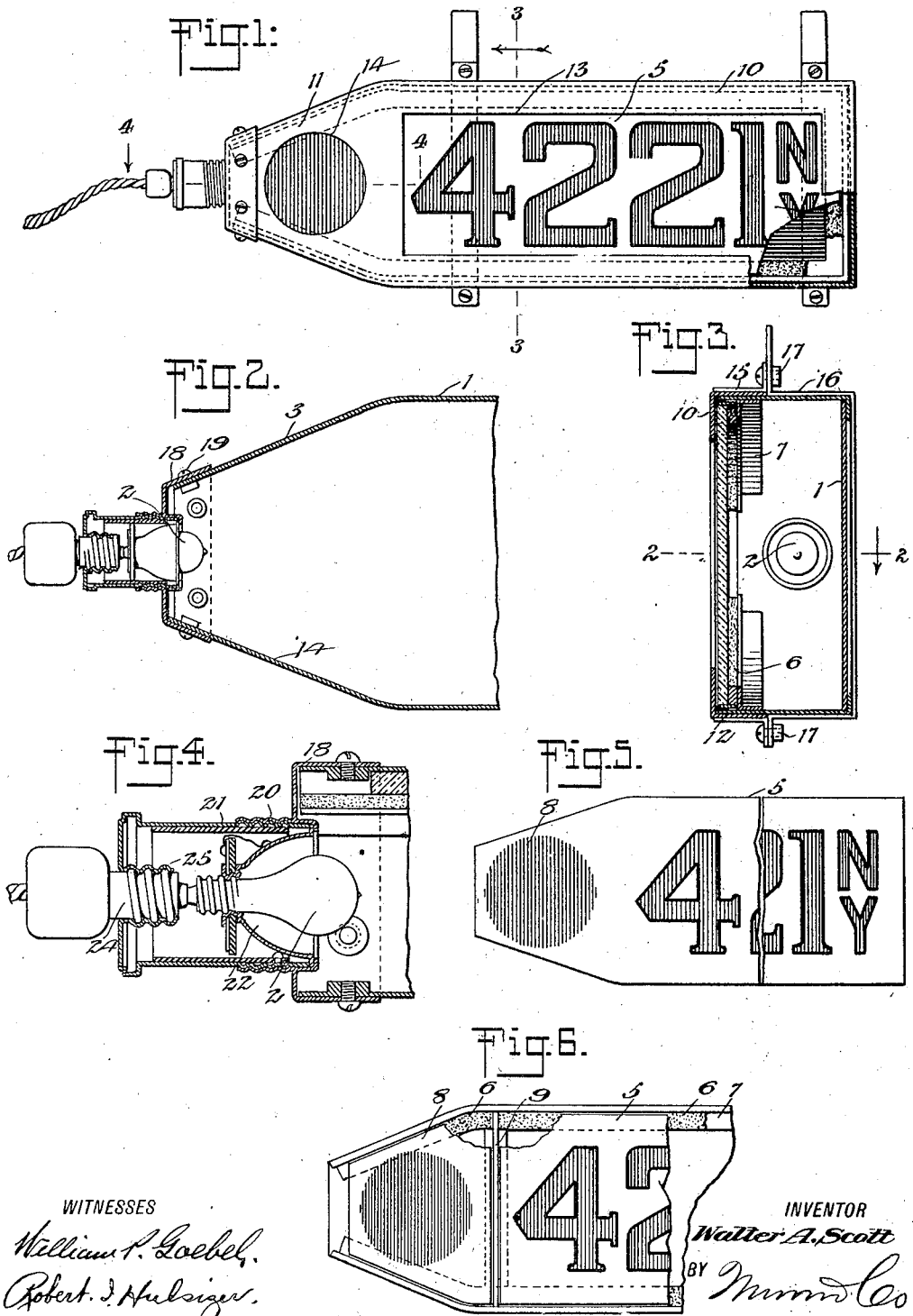
WITNESSES
INVENTOR
Walter A. Scott
ATTORNEYS Patented May 8, 1923.

1,454,792

UNITED STATES PATENT OFFICE.

WALTER A. SCOTT, OF BROOKLYN, NEW YORK.

AUTOMOBILE LICENSE-PLATE CASING.

Application filed May 5, 1922. Serial No. 558,639.

*To all whom it may concern:*

Be it known that I, WALTER A. SCOTT, a citizen of the United States, and a resident of the city of New York, borough of Brooklyn, in the county of Kings and State of New York, have invented a new and Improved Automobile License-Plate Casing, of which the following is a full, clear, and exact description.

This invention relates to an automobile license plate casing, and has for an object the provision of means whereby a simple, strong, efficient, economically manufactured casing is produced to support and illuminate the license plate as well as to serve as a tail light.

Another object resides in the provision of means whereby in the use of an ordinary small light a maximum and more uniform illumination of the plates is achieved.

A further object resides in the provision of means whereby the various parts can be assembled and disassembled quickly and easily.

A still further object resides in the particular construction and arrangement of parts which are hereinafter described and claimed and shown in the accompanying drawings.

The invention is illustrated in the drawings, of which—

Figure 1 is a front view of the casing.

Fig. 2 is a section taken on the line 2—2 of Fig. 3.

Fig. 3 is a section taken on the line 3—3 of Fig. 1 showing the parts slightly enlarged.

Fig. 4 is a section taken on the line 4—4 of Fig. 1.

Fig. 5 is a front view of one form of the license plate.

Fig. 6 is a detail plan view of the casing with the cover removed, showing another form of license plate.

The form of the invention shown in the drawings is a preferred form, although it is understood that modifications in the construction and arrangement of the parts and in the character of the materials used may be adopted without departing from the spirit of the invention.

This invention in general relates to a casing having a body portion 1 at one end adapted to receive a light 2. The side walls 3 and 4 of the light-receiving end 1 of the casing are tapered, as shown particularly in Fig. 2, and it is found that by reason of this tapering or convergence of the side walls the light is much more uniformly distributed and thrown through the front license plate 5. This license plate is preferably made of glass and has numbers painted on it in accordance with the number of the license. This plate is exposed on the front of the casing and is adapted to rest on a flexible cushion 6 which is supported on a flange 7 extending around the edges of the body portion near its open end. A tail light plate 8 is also disposed on the cushion 6 and the flange 7 but is separated from the license plate 5 by means of a partition 9. The tail light plate is preferably made of some transparent material, and may be colored, preferably red, in a manner well known. It is understood that the inner walls and bottom of the casing are very highly polished to permit of the maximum reflection of light. The body portion is adapted to receive a cover 10 which in its main portion is rectangular but at one end 11 has its edges tapered to conform to the taper or convergence of the walls 3 of the body portion 1. This cover portion is provided with the usual dependent flanges 12 and apertures 13 and 14 through which the license plate 5 and the tail light plate 8 are exhibited. As shown in Fig. 5, the tail light portion and the license plate portion may be made in one continuous sheet and placed in the casing, in which event the partition 9 is not provided. The cover and body portion are provided with straps, such as 15 and 16, which are connected to their respective casing portions and fastened together by any suitable means, such as 17.

The light-receiving end of the casing is provided with a somewhat cup-shaped cap 18 connected to the body portion by screws or other adjusting means 19. This cup-shaped cap has a threaded shell 20 into which a light supporting casing 21 can be threaded. The light 2 is disposed within this casing and has the usual reflectors 22. A threaded plug 24, in the well-known manner, is adapted to extend through a threaded socket 25 in the casing 21 and engage with the rear terminal of the light. It will be observed that in order to extinguish the light, it is merely necessary to unscrew the plug 24. When it is desired to remove the light, the tail 21 can be unscrewed from the cap 18. On the other hand, if it is desired to remove the cover 10 from the body portion of the casing, it is necessary to remove the cap 18 from the end of the body portion and cover and then to release the straps 15 and 16, whereupon the cover can be removed and the interior of the casing made accessible.

It will be observed, therefore, that I have provided a simple, efficient, economically manufactured casing having its walls so formed that a maximum distribution of the light is effected. Furthermore, the parts of the casing can be very readily dismantled for repair and cleaning. The arrangement of the parts is simple and compact. The lighting means can be very readily removed and operated, and the whole device is absolutely watertight. By reason of these facts, a simple, neat, efficient device is produced which will appeal to the owner of a car who desires to place such a device on his car, and which device will not detract from the appearance of the car.

It is, of course, understood that the numbers and colors used in connection with this device will be clearly visible in the daytime as well as when illuminated at night.

What I claim is:

An automobile license plate casing which comprises a body portion having one face open and a flanged cover to be placed thereover, the cover being apertured to exhibit the plate, the body portion having a flange around and near its upper edges to receive and support the plate, a cushion on said flange to be disposed between the plate and the flange, means for fastening the cover to the body portion, the walls of the casing and cover at one end sloping or converging toward each other, a cup-shaped cap removably fastened to this end, and means on said cap to support a light.

WALTER A. SCOTT.